United States Patent
Berionne et al.

(10) Patent No.: US 10,462,646 B2
(45) Date of Patent: Oct. 29, 2019

(54) METHODS AND APPARATUS FOR OPTIMIZATION OF SIM CARD INITIALIZATION

(71) Applicant: QUALCOMM Incorporated, San Diego, CA (US)

(72) Inventors: Michele Berionne, San Diego, CA (US); Jose Alfredo Ruvalcaba, Winchester, CA (US)

(73) Assignee: QUALCOMM Incorporated, San Diego, CA (US)

(*) Notice: Subject to any disclaimer, the term of this patent is extended or adjusted under 35 U.S.C. 154(b) by 581 days.

(21) Appl. No.: 13/894,227

(22) Filed: May 14, 2013

(65) Prior Publication Data
US 2014/0057679 A1    Feb. 27, 2014

Related U.S. Application Data

(60) Provisional application No. 61/693,086, filed on Aug. 24, 2012.

(51) Int. Cl.
*H04W 8/18* (2009.01)
*H04W 8/20* (2009.01)

(52) U.S. Cl.
CPC ........... *H04W 8/183* (2013.01); *H04W 8/205* (2013.01)

(58) Field of Classification Search
CPC ..... H04W 12/06; H04W 24/00; H04W 48/18; H04W 60/00; H04W 84/042; H04W 88/02; H04W 8/18; H04W 8/22; H04W 8/183; H04W 8/205; H04W 8/265

USPC ............... 455/558, 551; 709/203; 713/193; 380/270

See application file for complete search history.

(56) References Cited

U.S. PATENT DOCUMENTS

| | | | |
|---|---|---|---|
| 6,032,055 A | 2/2000 | Yazaki et al. | |
| 6,480,725 B2* | 11/2002 | Cassidy et al. | ............... 455/558 |
| 8,060,140 B2 | 11/2011 | Tak | |
| 2004/0166839 A1 | 8/2004 | Okkonen et al. | |
| 2006/0009217 A1* | 1/2006 | Lunden | ............. H04M 1/72525 455/435.1 |
| 2006/0116169 A1 | 6/2006 | Park | |
| 2006/0129638 A1* | 6/2006 | Deakin | ........................ 709/203 |
| 2006/0253668 A1 | 11/2006 | Borowski et al. | |
| 2007/0093266 A1 | 4/2007 | Oh et al. | |

(Continued)

FOREIGN PATENT DOCUMENTS

| | | |
|---|---|---|
| CN | 1784048 A | 6/2006 |
| CN | 101795328 A | 8/2010 |

(Continued)

OTHER PUBLICATIONS

International Search Report and Written Opinion—PCT/US2013/056529—ISA/EPO—dated Dec. 4, 2013.

*Primary Examiner* — Natasha W Cosme
(74) *Attorney, Agent, or Firm* — Arent Fox, LLP (57) ABSTRACT

Methods and apparatus for initializing a SIM card may include sending a request to read a file from the SIM card. In addition, the methods and apparatus may include receiving a SIM version identifier for the file from the SIM card and determining whether the SIM version identifier matches a cached version identified in a cache. When the SIM version identifier matches the cached version identifier, the methods and apparatus may include accessing the file from the cache.

18 Claims, 7 Drawing Sheets

(56) References Cited

U.S. PATENT DOCUMENTS

| | | | | |
|---|---|---|---|---|
| 2010/0035577 A1* | 2/2010 | Rager | ................ | H04L 63/1466 455/411 |
| 2010/0317320 A1* | 12/2010 | Sakargayan | ............ | H04L 63/08 455/410 |
| 2011/0002227 A1 | 1/2011 | Sampath et al. | | |
| 2011/0244921 A1 | 10/2011 | Weigele | | |

FOREIGN PATENT DOCUMENTS

| | | | | |
|---|---|---|---|---|
| CN | 102184375 A | | 9/2011 | |
| EP | 1662822 A1 | | 5/2006 | |
| GB | 2389279 A | | 12/2003 | |
| GB | 2452534 A | * | 3/2009 | .......... H04M 1/2745 |
| KR | 20100130714 A | | 12/2010 | |
| WO | 2011005791 A2 | | 1/2011 | |

* cited by examiner

METHODS AND APPARATUS FOR OPTIMIZATION OF SIM CARD INITIALIZATION

CLAIM OF PRIORITY UNDER 35 U.S.C. § 119

The present Application for Patent claims priority to Provisional Application No. 61/693,086 entitled "Methods and Apparatus for Optimization of SIM Card Initialization" filed Aug. 24, 2012, and assigned to the assignee hereof and hereby expressly incorporated by reference herein.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Other example networks include GPRS/EDGE, CDMA/DO, and/or EUTRAN (4G LTE).

Wireless devices may include a subscriber identity module (SIM) card to facilitate communication with communication network via a subscription for the designated voice and/or data subscription of the wireless device. When a SIM card is initialized (e.g., at power up or after a SIM card is inserted into the wireless device), the wireless device reads the content of several files stored on the SIM card. For example, during the initialization process various features stored on the SIM card (e.g., address book, text messages, network names, etc.) are read and made available to the wireless device. In addition, the initialization process may take a significant amount of time depending on the number of files on the SIM card, the size of the files on the SIM card and/or the number of records of the files on the SIM card. For example, each file on the SIM card may contain up to 255 records. Thus, if it takes an average of 30 ms to read each record, the initialization process may take over 7 seconds to read that particular file on the SIM card. Moreover, during the initialization process various services may be not be able to be accessed by a user of the wireless device until the corresponding files have been read from the SIM card.

Therefore, it would be desirable to have a method and apparatus that decrease the initialization time of a SIM card.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for initializing a SIM card may include sending a request to read a file from the SIM card. The method may also include receiving a SIM version identifier for the file from the SIM card. In addition, the method may include determining whether the SIM version identifier matches a cached version identifier in a cache. The method may further include accessing the file from the cache when the SIM version identifier matches the cached version identifier.

Another aspect relates to at least one processor configured to initialize a subscriber identity module (SIM) card. The processor may include a first module for sending a request to read a file from the SIM card. The processor may also include a second module for receiving a SIM version identifier for the file from the SIM card. In addition, the processor may include a third module for determining whether the SIM version identifier matches a cached version identifier in a cache. The processor may also include a fourth module for accessing the file from the cache when the SIM version identifier matches the cached version identifier.

Yet another aspect relates to a computer program product. The computer program product may include a computer-readable medium including a first set of codes for causing a computer to send a request to read a file from a subscriber identity module (SIM) card. The computer-readable medium may also include a second set of codes for causing the computer to receive a SIM version identifier for the file from the SIM card. The computer-readable medium may further include a third set of codes for causing the computer to determine whether the SIM version identifier matches a cached version identifier in a cache. In addition, the computer-readable medium may also include a fourth set of codes for causing the computer to access the file from the cache when the SIM version identifier matches the cached version identifier.

Another aspect relates to an apparatus. The apparatus may include means for sending a request to read a file from a subscriber identity module (SIM) card. The apparatus may also include means for receiving a SIM version identifier for the file from the SIM card. The apparatus may additionally include means for determining whether the SIM version identifier matches a cached version identifier in a cache. Moreover, the apparatus may include means for accessing the file from the cache when the SIM version identifier matches the cached version identifier.

Yet another aspect relates to an apparatus. The apparatus may include a read component operable to send a request to read a file from a subscriber identity module (SIM) card and receive a version identifier for the file from the SIM card. The apparatus may also include a verification component operable to determine whether the SIM version identifier matches a cached version identifier in a cache. In addition, the apparatus may include the read component being further operable to access the file from the cache when the SIM version identifier matches the cached version identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for optimization of a SIM card initialization. Upon initializing a SIM card (e.g., at power up of a wireless device, inserting a SIM card into the wireless device and/or leaving airplane mode), the described methods and apparatus may determine whether the content stored in a cache of the wireless device has changed from a previous initialization. In an aspect, the wireless device may compare a SIM version identifier (ID) of content stored on the SIM card with a cached version ID of content stored in the cache of the wireless device. When a match occurs, the wireless device may determine that the wireless device may perform the read operation by directly accessing the content from a cache of the wireless device, and therefore, reduce the amount of time involved in the read operation. When a match does not occur, the wireless device may perform the read operation from the SIM card.

Figure 1:
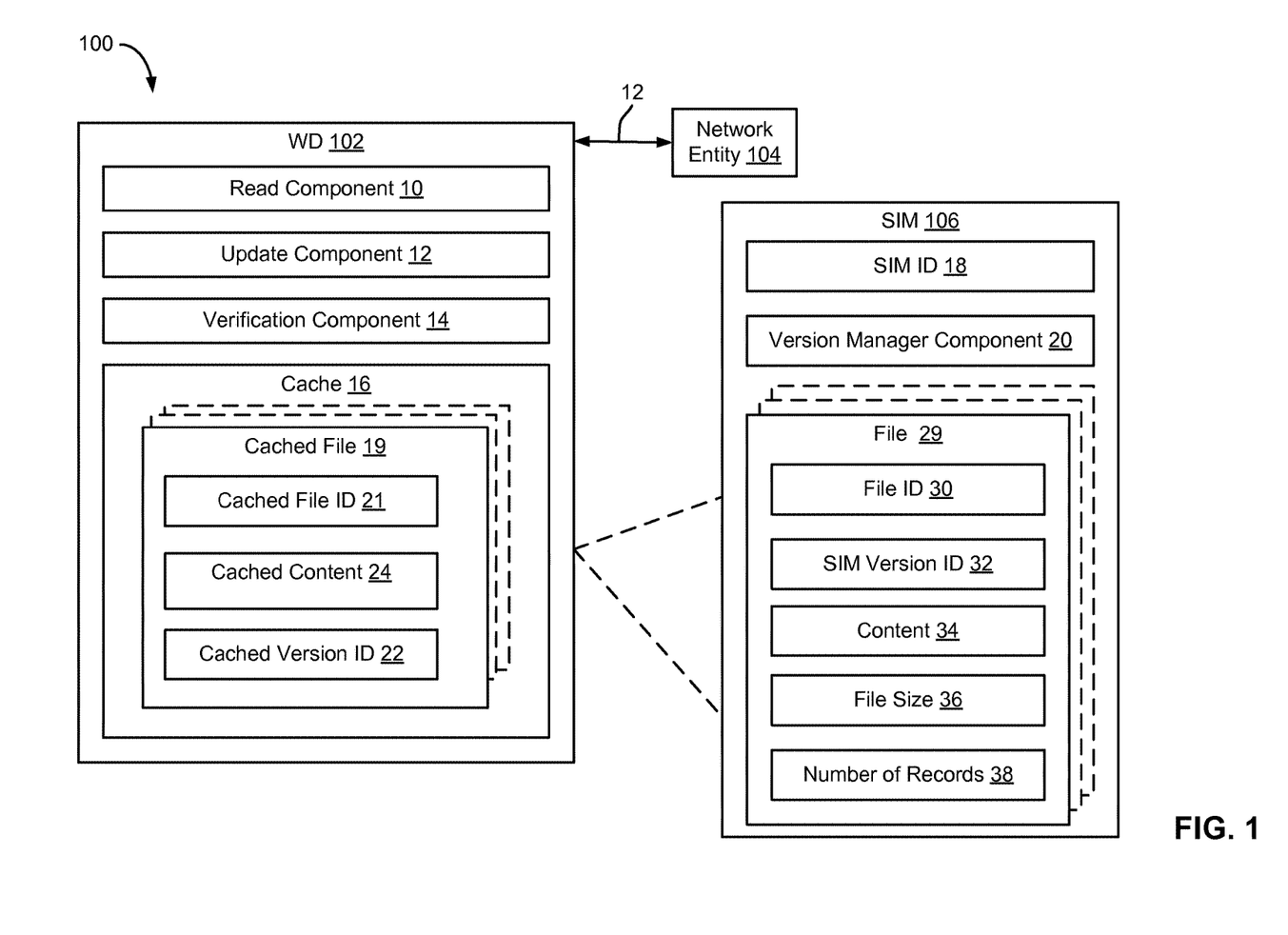
FIG. 1 is an illustration of a connectivity system in accordance with an aspect.

Referring now to FIG. 1, a wireless communication system 100 includes one or more wireless devices 102 that communicate with one or more network entities 104 to receive wireless network access. Network entity 104 may include one or more of any type of network component, such as an access point, including a base station (BS) or node B, a relay, a peer-to-peer device, a radio network controller (RNC), an authentication, authorization and accounting (AAA) server, a mobile switching center (MSC), etc., that can enable wireless device 102 to communicate and/or that can establish and maintain a communication link 12.

Wireless device 102 may include any mobile, portable computing or communications device, such as a cellular device, that may connect to a network entity. Wireless devices 102 may be, for example, a cellular telephone, a navigation system, a computing device, a camera, a PDA, a music device, a gaming device or a handheld device having wireless connection capability, among other devices.

In an aspect, wireless device 102 may be a device that accesses a network, such as network entity 104, based on subscription information in a SIM 106. For example, SIM 106 may be associated with a subscription, such as a voice and/or data subscription for accessing the network. In addition, SIM 106 may have a unique identifier 18, such as an integrated circuit card identifier (ICCID) that uniquely identifies each SIM card. SIM 106 may also have one or more files 29 stored therein. File 29 may include, but are not limited to, service provider names, address books, applications, SMS messages, preferred roaming lists, international mobile subscriber identity (IMSI), temporary identities, network parameters, and femto cell identifiers, among others. In addition, each file 29 stored on SIM 106 may be record-based or binary.

The files 29 may include various content 34 and SIM 106 may have a file ID 30 that identifies each file stored on SIM 106. In addition, SIM 106 may generate a SIM version ID 32 that identifies a version of the content 34 of the respective files. For example, SIM version ID 32 may be generated by the SIM as a hash value of the content of the file 29 and/or as a counter that is increased every time the content of the files changes. The file 29 may include a file size 36 that identifies the number of bytes in a binary file. In addition, the file 29 may include a number of records 38 in a record based file.

SIM 106 may further include a version manager component 20 operable to manage the files 29 stored on SIM 106 and manage the SIM version IDs 32 of the versions of content 34 associated with files 29. Version manager component 20 may determine whether the version of the content 34 and/or the SIM version ID 32 may need updating. As such, version manager component 20 may monitor which files 29 are updated on SIM 106 and may ensure the corresponding version ID 32 is updated accordingly.

Wireless device 102 may communicate with SIM 106 and may include a cache 16 operable to store copies of one or more files 29 from SIM 106, referred to as a cached file 19, locally on wireless device 102. It should be noted that cache 16 may store cached files 19 corresponding to different files 29 from a plurality of SIMs 106, thus cache 16 may associate the appropriate SIM ID 18 with the cached file 19 stored in cache 16. Moreover, each cached file 19 stored in cache 16 may have cached content 24 associated with the cached file 19 and a cached version ID 22 that identifies a version of the cached content 24.

Wireless device 102 may also have a read component 10 operable to select a file 29 to read from SIM 106 and/or a cached file 19 to read from cache 16. For example, when a user of wireless device 102 launches an address book, read component 10 may send a request to SIM 106 and/or cache 16 to obtain the address book file. In another example, a user of wireless device may reinsert SIM 106 into wireless device and read component 10 may send a request to read all the files on SIM 106 as part of a SIM initialization procedure. Upon receiving a request for a file from read component 10, SIM 106 may access the file ID 30 for the requested file and use the version manager component 20 to return a SIM version ID 32 for the version of content 34 stored in SIM 106.

In addition, wireless device 102 may have a verification component 14 operable to receive the SIM version ID 32 from SIM 106 and may also determine whether the received SIM version ID 32 matches the cached version ID 22 for the cached content 24. When a match does not occur, verification component 14 may send a message to read component 10 to perform the read operation from SIM 106 for the requested file. When a match does occur, verification component 14 may determine that the cached content 24 matches the content 34 of SIM 106 and may send a message to read component 10 to perform the read operation from cache 16 for the selected file. Therefore, when content does not change on SIM 106, wireless device 102 may perform read operations directly from cache 16 without having to perform the read operation from SIM 106. Thus, the time involved during the read operation may be reduced. Moreover, by reducing the read time, the power required for the read operation may also be reduced.

Wireless device 102 may further include an update component 12 operable to update the cached content 24 of files stored in cache 16 and the content 34 stored on SIM 106. Update component 12 may also be used to keep the cached content 24 synchronized with the content 34 stored on SIM 106. For example, update component 12 may communicate with SIM 106 and SIM 106 may use version manager component 20 to aid in the synchronization among the cached content 24 and the content 34 stored on SIM 106.

Figure 2:
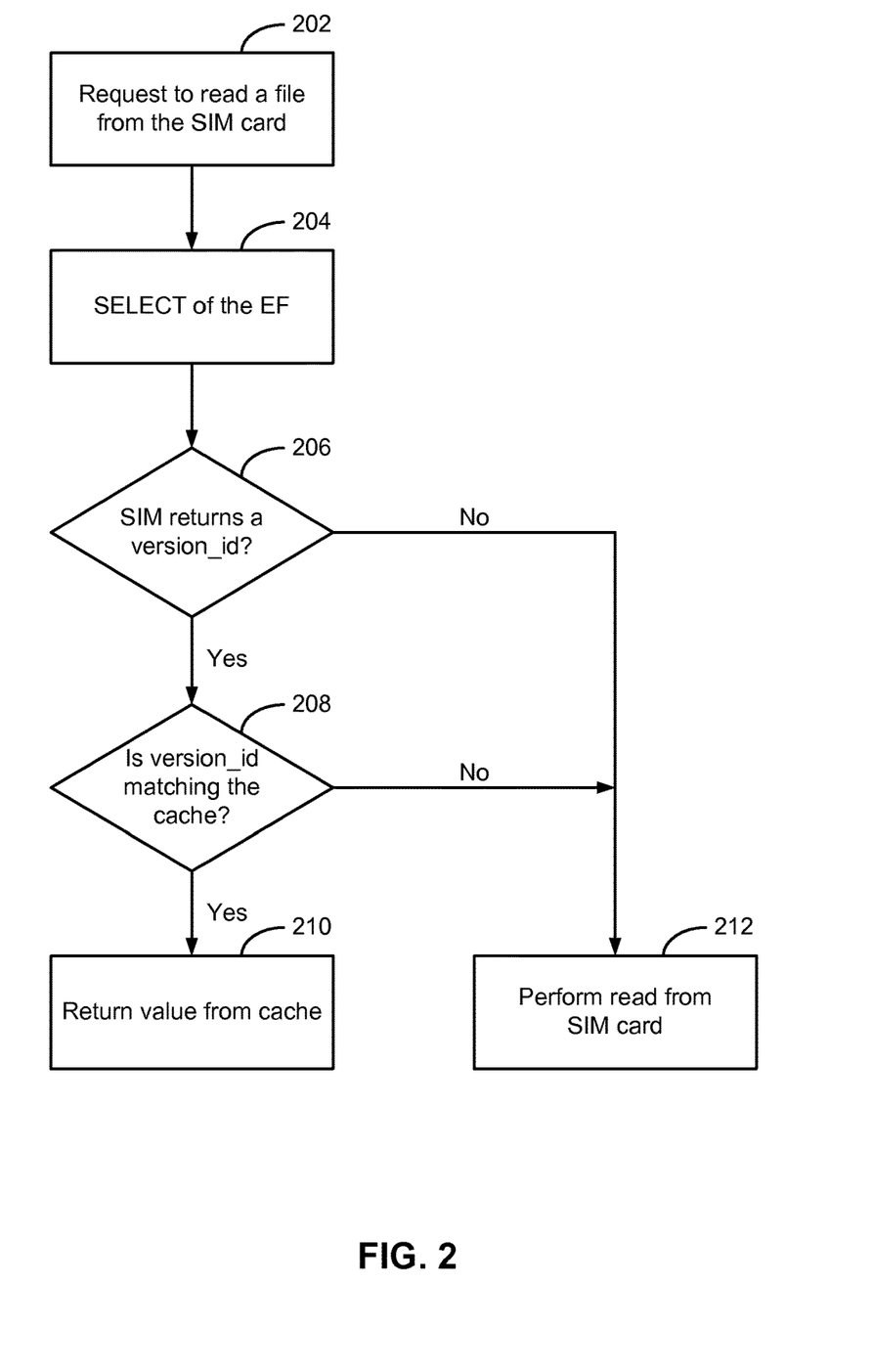
FIG. 2 is a flow chart illustrating a method for a read operation in accordance with an aspect.

Referring now of FIG. 2, method 200 for performing a read operation in accordance with an aspect includes, at 202, sending a request to read a file from the SIM card. For example, read component 10 (FIG. 1) of wireless device 102 (FIG. 1) may send a request to SIM 106 (FIG. 1) to read a file. The request may include a file ID and/or name. In an aspect, read component 10 may automatically send the request upon the wireless device powering on, the wireless device recognizing a new SIM card, and/or the wireless device switching between modes of operation (e.g., from an airplane mode to normal mode). In addition, read component 10 may send the request upon a user of wireless device 102 accessing one or more files. For example, when a user access an address book on wireless device 102, read component 10 may send the request to read the address book from the SIM card. While the below example illustrates requesting to read a single file, it should be noted that the read component may request multiple files to be read from the SIM card.

The method may also include, at 204, selecting the elementary file (EF). For example, the read component 10 may send a SELECT command and provide SIM 106 (FIG. 1) with a file ID 30 for the selected file.

Next, at 206, the method may include determining whether the SIM card returned a version ID for the requested file. For example, read component 10 (FIG. 1) may determine whether SIM 106 returned a SIM version ID for the requested file. In an aspect, the SIM version ID for the requested file may be included as a field in a response message generated by SIM 106.

At 212, when the SIM card does not return a version ID for the requested file, the method may include performing the requested read operation from the SIM card. The SIM card may not return a SIM version ID for the requested file, for example, when the SIM card does not support this feature and/or when the SIM card does not have resources to calculate it in a timely fashion. In an aspect, when read component 10 determines that SIM 106 did not return a SIM version ID for the requested file, read component 10 may perform the requested read operation from SIM 106.

At 208, when the SIM card does return a version ID for the requested file, the method may include determining whether the received version ID matches the version ID in the cache for the requested file. The version IDs for the requested file may match when the version of the content in the cache is the same as the version of the content stored on the SIM card. For example, verification component 14 (FIG. 1) may determine whether the received SIM version ID for the requested file from SIM 106 matches the cached version ID 22 (FIG. 1) for the requested file in cache 16 (FIG. 1) of wireless device 102.

At 210, when the received version ID matches the cached version ID, the method may include returning the cached content from the cache for the requested file. In an aspect, read component 10 may retrieve the cached content 24 (FIG. 1) from the cache 16 in response to the read request when verification component 14 determines that the received SIM version ID matches the cached version ID of the content stored in the cache 16.

At 212, when the received version ID does not match the cached version ID, the method may include performing the requested read of the file from the SIM card. For example, when verification component 14 determines that the received version ID and the cached version ID are not a match, read component 10 may perform the requested read operation from SIM 106.

Figure 3:
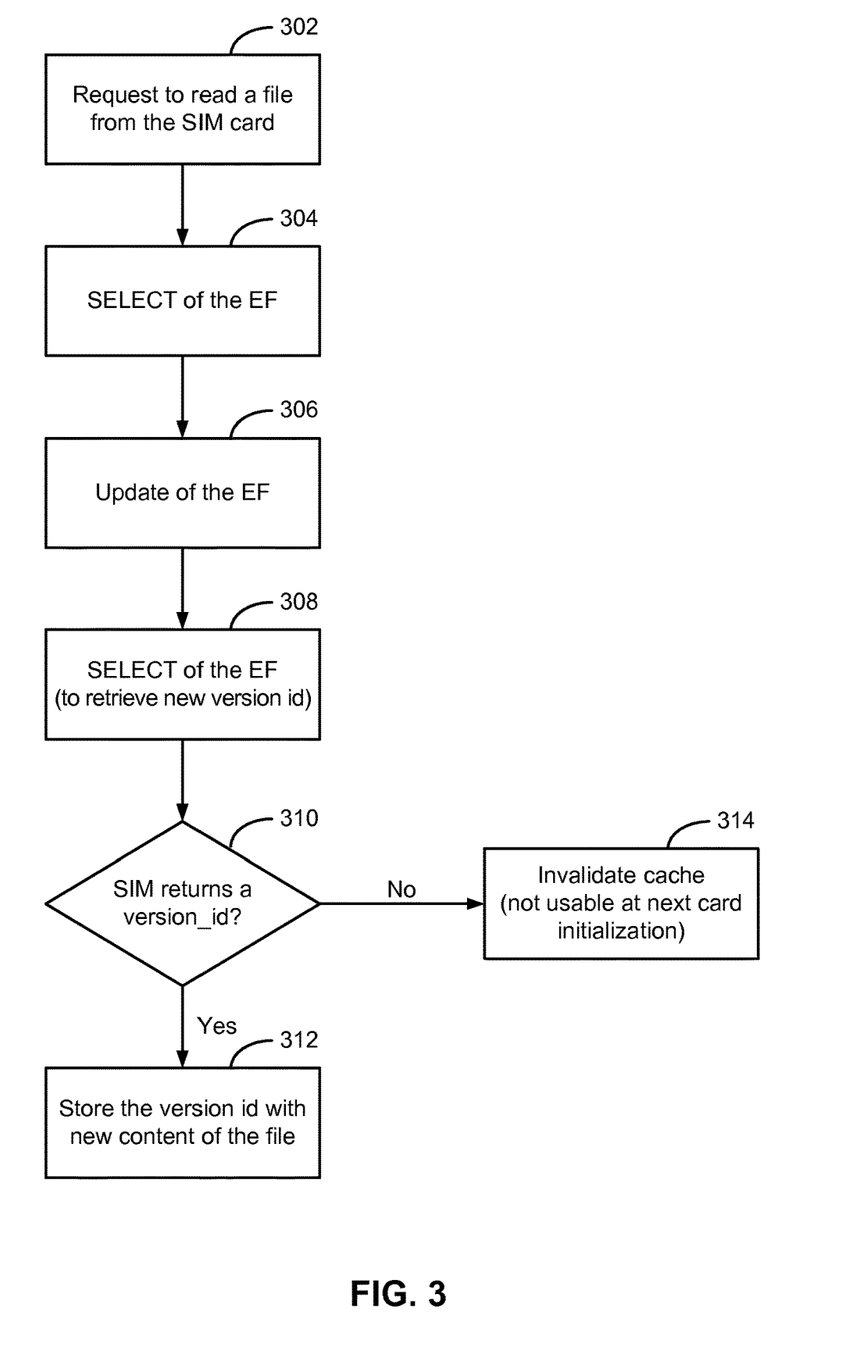
FIG. 3 is a flow chart illustrating a method for an update operation in accordance with an aspect.

Referring now to FIG. 3, method 300 for performing an update operation in accordance with an aspect includes, at 302, sending a request to update a file on the SIM card. For example, update component 12 (FIG. 1) may send a request to SIM 106 (FIG. 1) to update a file on SIM 106. A file may need to be updated, for example, when a user of a wireless device changes a telephone number of a contact stored in an address book on the wireless device.

At 304, the method may include selecting the elementary file (EF), and at 306, updating the elementary file. For example, update component 12 may send a SELECT command for the file that may need to be updated and may make the necessary updates to the selected file. In addition, update component 12 may send the updated information for the file to SIM 106 (FIG. 1) to store on SIM 106 in association with the file.

At 308, the method may include selecting the elementary file and retrieving the new version ID for the updated file. For example, the read component 10 (FIG. 1) may send a SELECT command for the elementary file and may also send a request to retrieve the new SIM version ID from SIM 106 corresponding to the updated content for the elementary file.

At 310, the method may also include determining whether the SIM card returns a version ID corresponding to the updated file. In an aspect, the update component 12 may determine whether the SIM 106 returns a SIM version ID 32 (FIG. 1) for the requested file. For example, the SIM version ID may be included as a field in a response message to the SELECT command.

At 312, the method may further include storing the received version ID with the new content of the file. For example, if the update component 12 determines that the SIM 106 returns a SIM version ID for the selected file, the update component 12 may send a notification to cache 16 (FIG. 1) to store the received version ID with the new content file. Thus, by updating the cache filed ID with the received version ID and updating the cached content with the new content file as content is updated and/or changes in a file, the cache may remain synchronized with the content of the file stored on the SIM card.

At 314, the method may include invalidating the cache if the SIM card does not return a version ID. For example, if verification component 14 determines that the SIM 106 does not return a SIM version ID for the requested file, the verification component may send a notification to invalidate the contents of the cache for the selected file.

Figure 4A:
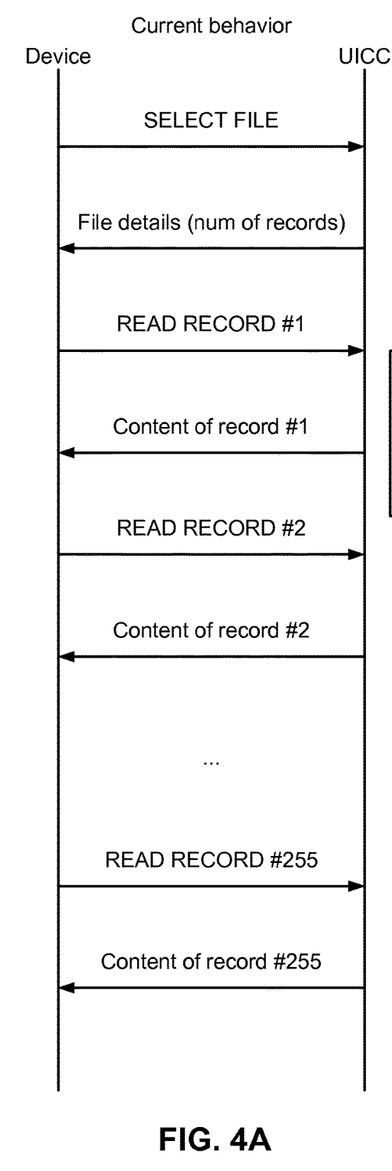
FIGS. 4A and 4B are sequence diagrams for a read operation of a file with records in accordance with an aspect.
Figure 4B:
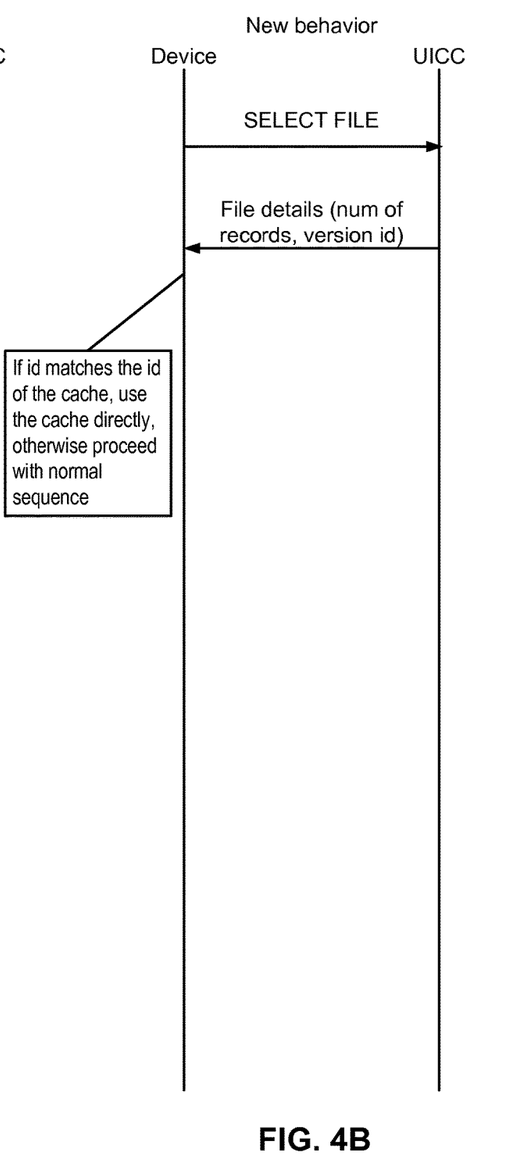

Referring now to FIGS. 4A and 4B, therein illustrated are sequence diagrams for a read operation of a file with records in accordance with an aspect. FIG. 4A illustrates a current behavior of a read operation in accordance with an aspect. For example, a current behavior may include a read operation where the wireless device does not receive a version ID for a selected file from a SIM. FIG. 4B illustrates a read operation where a wireless device receives a version ID for a selected file from a SIM in accordance with an aspect.

Referring to FIG. 4A, illustrated therein is a sequence diagram for a current behavior of a read record operation in accordance with an aspect. For example, wireless device 102 (FIG. 1) may send a SELECT command to SIM 106 (FIG. 1) identifying a file to read from SIM 106. SIM 106 may return a message with the file details, e.g., a number of records for the file. Wireless device 102 may send a READ command to read the first record of the file and SIM 106 may return the content for the first record. The process may continue until the total number of records is read for the requested file identified in the SELECT command.

FIG. 4B illustrates a sequence diagram for a read record operation in accordance with an aspect. For example, wireless device 102 (FIG. 1) may send a SELECT command to SIM 106 (FIG. 1) to read a file identified in the SELECT command from SIM 106. SIM 106 may return a message with the file details, such as number of records for the file and a version ID for the file. In an aspect, the return message may have an additional field for the version ID for the requested file. When the received version ID from SIM 106 matches a cached version ID 22 (FIG. 1) for cached content 24 (FIG. 1) on wireless device 102, wireless device 102 may perform the read for the requested file directly from cache 16 (FIG. 1). Otherwise, when the received version ID from SIM 106 does not match a cached version ID 22, wireless device 102 may proceed with the read sequence as discussed in reference to FIG. 4A.

Figures 5A, 5B:
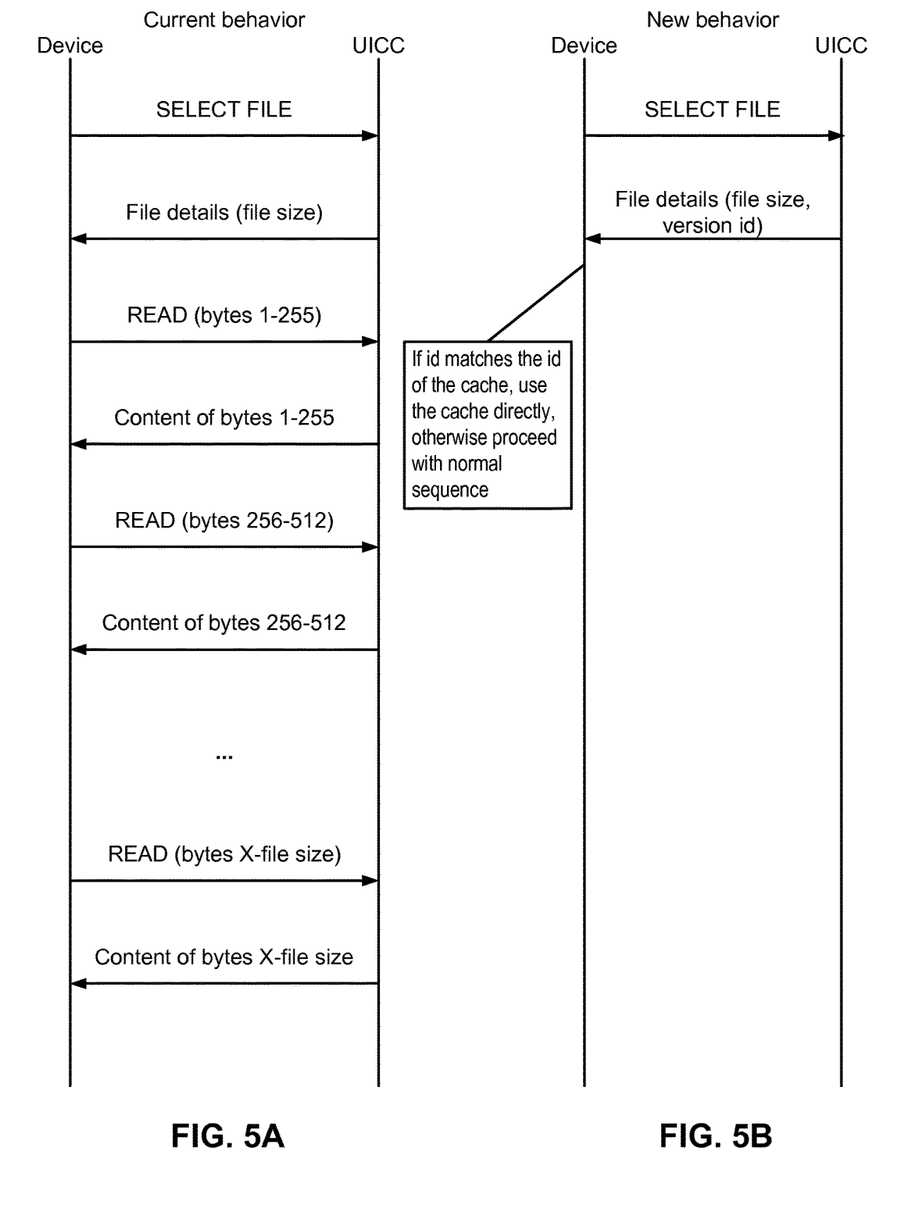
FIGS. 5A and 5B are sequence diagrams for a read operation of a binary file in accordance with an aspect.

Referring now to FIGS. 5A and 5B therein, illustrated are sequence diagrams for a read operation of a binary file in accordance with an aspect. FIG. 5A illustrates a current behavior of a read operation in accordance with an aspect. For example, a current behavior may include a read operation where the wireless device does not receive a version ID for a selected file from a SIM. FIG. 5B illustrates a read operation where a wireless device receives a version ID for a selected file from a SIM in accordance with an aspect.

Referring to FIG. 5A, illustrated therein is a sequence diagram for a current behavior of a read binary record operation in accordance with an aspect. For example, wireless device 102 (FIG. 1) may send a SELECT command to SIM 106 (FIG. 1) identifying a file to read from SIM 106. SIM 106 may return a message with the file details, e.g., a file size for the requested file. Wireless device 102 may send a READ command to read a first number of bytes for the file (e.g., bytes 1-255) and SIM 106 may return the content for the first number of bytes. The process may continue until the total number bytes are read for the requested file identified in the SELECT command.

FIG. 5B illustrates a sequence diagram for a read binary record operation in accordance with an aspect. For example, wireless device 102 (FIG. 1) may send a SELECT command to SIM 106 (FIG. 1) to read a file identified in the SELECT command from SIM 106. SIM 106 may return a message with the file details, such as the file size and a version ID for the file. In an aspect, the return message may have an additional field for the version ID for the requested file. When the received version ID from SIM 106 matches a cached version ID 22 (FIG. 1) for cached content 24 (FIG. 1) on wireless device 102, wireless device 102 may perform the read for the requested file directly from cache 16 (FIG. 1). Otherwise, when the received version ID from SIM 106 does not match a cached version ID 22, wireless device 102 may proceed with the read sequence as discussed in reference to FIG. 5A.

Figure 6A:
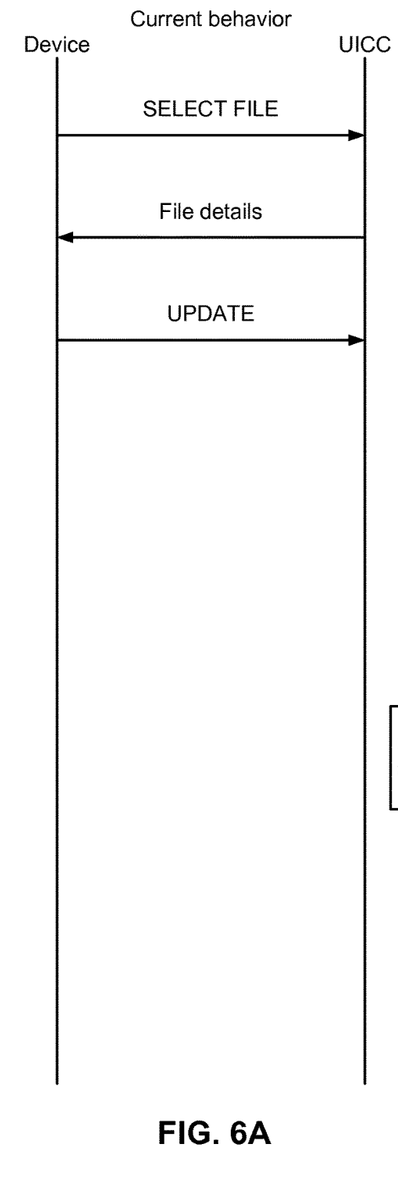
FIGS. 6A and 6B are sequence diagrams for an update operation in accordance with an aspect.
Figure 6B:
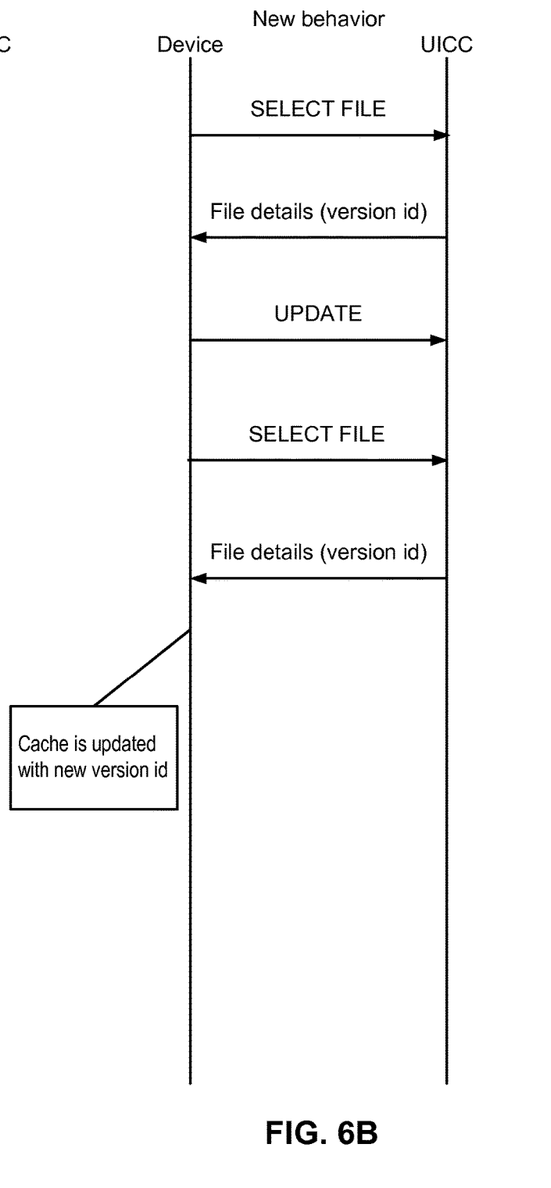

Referring now to FIGS. 6A and 6B, therein illustrated are sequence diagrams for an update operation in accordance with an aspect. FIG. 6A illustrates a current behavior of an update operation in accordance with an aspect. For example, a current behavior may include an update operation where the wireless device does not receive a version ID for a selected file from a SIM. While FIG. 6B illustrates an update operation where a wireless device receives a version ID for a selected file from a SIM in accordance with an aspect.

FIG. 6A illustrates a sequence diagram for a current behavior of an update operation in accordance with an aspect. For example, wireless device 102 (FIG. 1) may send a SELECT command to SIM 106 (FIG. 1) identifying a file to update on SIM 106. SIM 106 may return a message with the file details, e.g., a file size or number of records for the requested file. Wireless device 102 may send an UPDATE command to update the file on SIM 106.

FIG. 6B illustrates a sequence diagram for an update operation in accordance with an aspect. For example, wireless device 102 (FIG. 1) may send a SELECT file command to SIM 106 (FIG. 1) identifying a file to update on SIM 106. SIM 106 may return a message with the file details, such as the file size, number of records, and a version ID for the file. In an aspect, the return message may have an additional field for the version ID for the requested file. Wireless device 102 may send an UPDATE command to SIM 106 to update the file. SIM 106 internally updates the version ID for the updated file using the version manager component 20 (FIG. 1). Next, wireless device 102 may send a SELECT command to SIM 106 identifying the updated file. SIM 106 may send a response message with the file details and the version ID for the updated file. In an aspect, the return message may have an additional field for the version ID. Wireless device 102 may update the cache 16 with the updated version ID received from SIM 106 so that the cache 16 may be synchronized with the updated files on SIM 106.

Figure 7:
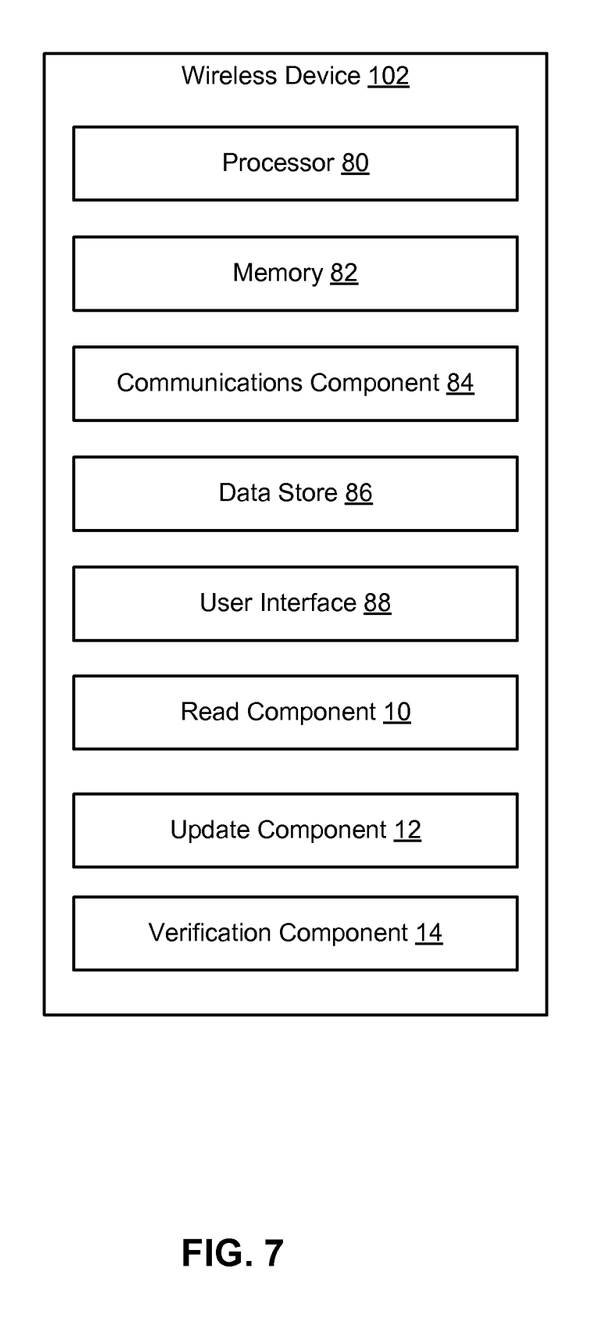
FIG. 7 is an example device operable within the connectivity system in accordance with an aspect.

Referring now to FIG. 7, illustrated is an example wireless device 102 operable within the connectivity system in accordance with an aspect.

In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may include a read component 10 (FIG. 1), an update component 12 (FIG. 1), and a verification component 14 (FIG. 1), such as in specially programmed computer readable instructions or code, firmware, hardware, or some combination thereof. In an aspect, communications component 84 may transmit and/or receive messages corresponding to the operation of read component 10, update component 12, verification component 14. In addition, processor 80 may execute read component 10, update component 12, verification component 14 and memory 82 or data store 86 may store them.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for initializing, a subscriber identity module (SIM) card having a SIM identifier, the method comprising:
    sending a request to read a file from the SIM card, wherein the file includes a selected elementary file (EF);
    determining whether a SIM version identifier has been received for the file from the SIM card, wherein the SIM version identifier identifies a version of the file and wherein the SIM version identifier is updated by the SIM card when the file is updated or changed;
    accessing the file from the SIM card in response to determining that the SIM version identifier has not been received for the file from the SIM card;
    determining whether the SIM version identifier matches a cached version identifier in response to determining that the SIM version identifier has been received for the file from the SIM card;
    accessing the file from a cache in response to determining that the SIM version identifier matches the cached version identifier; and
    accessing the file from the SIM card in response to determining that the SIM version identifier does not match the cached version identifier.

2. The method of claim 1, wherein the request is sent upon at least one or more of a power up of a wireless device, inserting the SIM card into a wireless device, and leaving an airplane mode of the wireless device.

3. The method of claim 1, further comprising:
    sending an update request to update the file on the SIM card;
    receiving an updated version identifier from the SIM card in response to the update request; and
    storing the updated file and version identifier in the cache.

4. The method of claim 3, further comprising:
    determining whether a new SIM version identifier was received with the updated file; and
    storing the new SIM version identifier with the updated file in the cache when the new SIM version identifier is received with the updated file.

5. The method of claim 4, further comprising:
    invalidating the cache when the new SIM version identifier is not received with the updated file.

6. The method of claim 1, wherein the file comprises one of a service provider name, an address books, an application, a SMS message, a preferred roaming list, an international mobile subscriber identity (IMSI), a temporary identity, network parameters, and femto cell identifiers.

7. An apparatus for initializing a subscriber identity module (SIM) card having a SIM identifier, comprising:
    a memory; and
    a processor coupled to the memory and configured to:
        send a request to read a file from the SIM card, wherein the file includes a selected elementary file (EF);
        determine whether a SIM version identifier has been received for the file from the SIM card, wherein the SIM version identifier identifies a version of the file and wherein the SIM version identifier is updated by the SIM card when the file is updated or changed;
        access the file from the SIM card in response to determining that the SIM version identifier has not been received for the file from the SIM card;
        determine whether the SIM version identifier matches a cached version identifier in response to determining that the SIM version identifier has been received for the file from the SIM card;
access the file from a cache in response to determining that the SIM version identifier matches the cached version identifier; and
access the file from the SIM card in response to determining that the SIM version identifier does not match the cached version identifier.

8. A non-transitory computer-readable medium comprising code for:
sending a request to read a file from a subscriber identity module (SIM) card having a SIM identifier, wherein the file includes a selected elementary file (EF);
determining whether a SIM version identifier has been received for the file from the SIM card, wherein the SIM version identifier identifies a version of the file and wherein the SIM version identifier is updated by the SIM card when the file is updated or changed;
accessing the file from the SIM card in response to determining that the SIM version identifier has not been received for the file from the SIM card;
determining whether the SIM version identifier matches a cached version identifier in a in response to determining that the SIM, version identifier has been received for the file from the SIM card;
accessing the file from a cache in response to determining that the SIM version identifier matches the cached version identifier; and
accessing the file from the SIM card in response to determining that the SIM version identifier does not match the cached version identifier.

9. An apparatus, comprising:
means for sending a request to read a file from a subscriber identity module (SIM) card having a SIM identifier, wherein the file includes a selected elementary file (EF);
means for determining whether a SIM version identifier has been received for the file from the SIM card, wherein the SIM version identifier identifies a version of the file and wherein the SIM version identifier is updated by the SIM card when the file is updated or changed;
means for accessing the file from the SIM card in response to determining that the SIM version identifier has not been received for the file from the SIM card;
means for determining whether the SIM version identifier matches a cached version identifier in response to determining that the SIM version identifier has been received for the file from the SIM card;
means for accessing the file from a cache in response to determining that the SIM version identifier matches the cached version identifier; and
means for accessing the file from the SIM card in response to determining that the SIM version identifier does not match the cached version identifier.

10. The apparatus of claim 7, wherein the request is sent upon at least one or more of a power up of a wireless device, inserting the SIM card into, a wireless device, and leaving an airplane mode of the wireless device.

11. The apparatus of claim 7, further comprising wherein the processor is further configured to:
send an update request to update the file on the SIM card and receive an updated version identifier from the SIM card after the update request,
wherein the cache is further operable to store the updated file.

12. The apparatus of claim 11, wherein the processor is further configured to determine whether a new SIM version identifier was received with the updated file, and
wherein the cache is further operable to store the new SIM version identifier with the updated file when the new SIM version identifier is received with the updated file.

13. The apparatus of claim 12, wherein the processor is further configured to invalidate the cache when the new SIM version identifier is not received with the updated file.

14. The apparatus of claim 7, wherein the file comprises one of a service provider name, an address books, an application, a SMS message, a preferred roaming list, an international mobile subscriber identity (IMSI), a temporary identity, network parameters, and femto cell identifiers.

15. The method of claim 1, wherein the SIM version identifier comprises a hash value of a content of the file.

16. The method of claim 1, wherein determining whether the SIM version identifier has been, received for the file from the SIM card includes determining whether the SIM version identifier for the file is included in a field of a response message generated by SIM.

17. The method of claim 1, further comprising:
sending a SELECT command to provide the SIM card with a file identifier for the selected EF.

18. The method of claim 1, wherein the SIM version identifier and the SIM identifier are stored in the SIM card.

* * * * *